C. SOWDEN.
DISH WASHING MACHINE.
APPLICATION FILED OCT. 18, 1913.

1,184,587.

Patented May 23, 1916.

Witnesses  
M. S. Watson

Inventor  
C. Sowden  
By Chandler & Chandler  
Attorneys

UNITED STATES PATENT OFFICE.

CHARLES SOWDEN, OF BEATRICE, NEBRASKA.

DISH-WASHING MACHINE.

1,184,587.    Specification of Letters Patent.    Patented May 23, 1916.

Application filed October 18, 1913. Serial No. 795,905.

*To all whom it may concern:*

Be it known that I, CHARLES SOWDEN, a citizen of the United States, residing at Beatrice, in the county of Gage, State of Nebraska, have invented certain new and useful Improvements in Dish-Washing Machines; and I do hereby declare the following to be a full, clear, and exact description of the invention, such as will enable others skilled in the art to which it appertains to make and use the same.

The present invention is directed to improvements in dish washing machines, and has for its object to so construct a device of this character that a number of dishes may be placed therein and thoroughly washed with little exertion upon the part of the operator.

A further object of the invention is to provide a portable apparatus of this character which is exceedingly simple in construction, inexpensive and effective in operation.

With these and other objects in view, this invention resides in the novel features of construction, formation, combination and arrangement of parts to be hereinafter more fully described, claimed and illustrated in the accompanying drawing, in which:—

Figure 1:
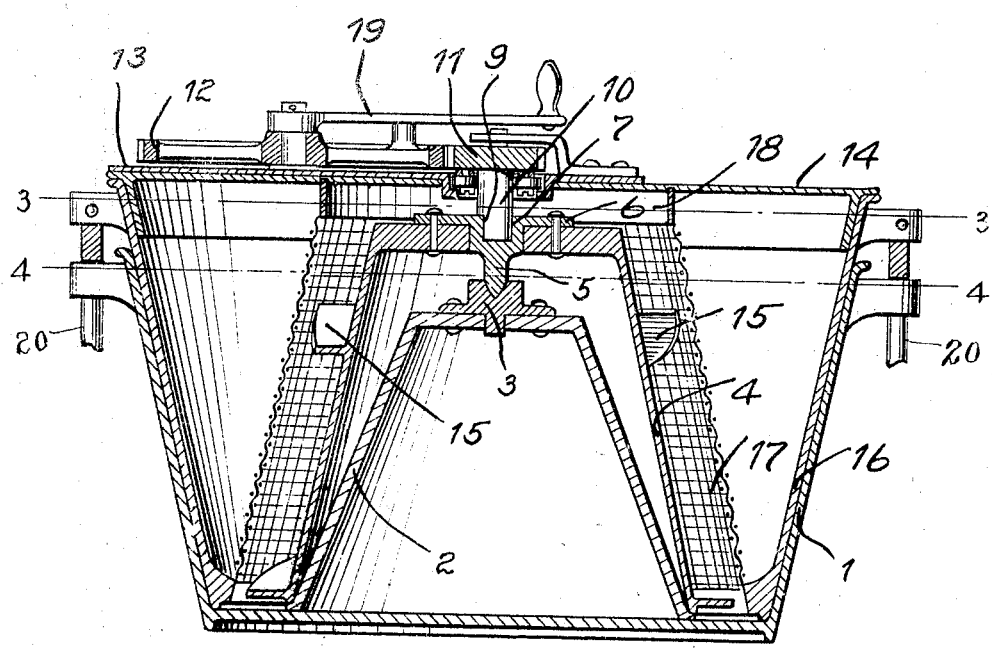
Figures 2, 3:
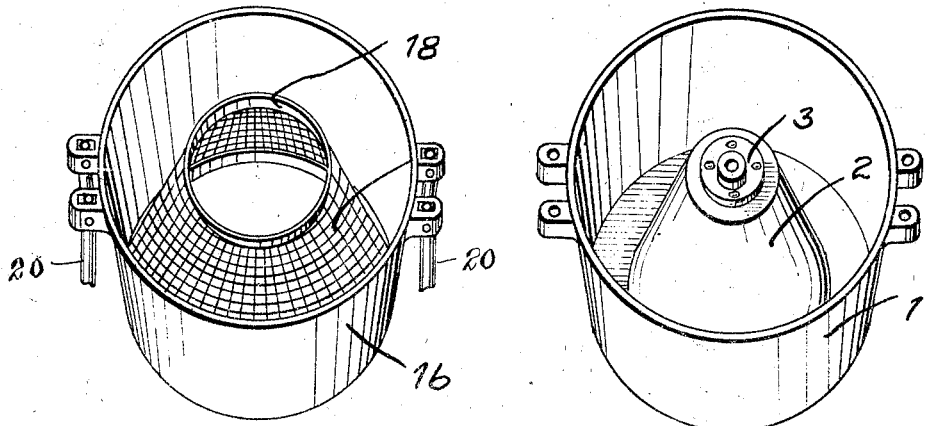

Figure 1 is a vertical sectional view through the device. Fig. 2 is a perspective view of the dish containing receptacle. Fig. 3 is a similar view of the main receptacle.

Referring to the drawing, the numeral 1 designates the main receptacle, which is preferably formed from sheet metal and is circular in formation. Fixed to the bottom of the receptacle 1 in any suitable manner is a truncated cone 2, which is formed also from sheet metal and has fixed to its upper end a bearing 3, the purpose of which will appear later. The revoluble cone 4, is also truncated and has fixed to its minor end a spindle 5, which engages the bearing 3. The spindle 5 is provided with an attaching flange 6 and central socket 7, said socket having a shoulder 8 for engaging the flat face 9 of the shaft 10, said shaft having fixed to its upper end a pinion 11 which meshes with a gear 12, which is revolubly mounted upon the brace strip 13 carried by the cover 14. The cone 4 is provided with a pair of spiral ribs 15 which serve, when said cone is rotated to project the water contained in the machine outwardly.

Removably mounted in the main receptacle 1 is a dish containing receptacle 16, which is bottomless and supports the lower end of the wire mesh truncated cone 17, the upper end of which is provided with a protecting band 18, which prevents collapsing of the upper end of the cone 17. The dishes are placed in the annular space formed between the wall of the receptacle 16 and the mesh cone 17, whereupon the crank handle 19 is operated, whereby, through the medium of the gear 12 and pinion 11 the shaft 10 is rapidly rotated, thus transmitting rotary movement to the cone 4, the spiral ribs thereof serving to project the water against the dishes. After the dishes have been thoroughly washed the receptacle 16 is removed from the main receptacle 1, and upon removal of the cover 14 the dishes can be removed and dried. Further it will be noted that the dishes are washed upon merely placing boiling water in the receptacle 16, and rapidly rotating the cone 4. After the dishes have been washed and it is desired to dry the same the cover 14 is removed and the receptacles 16 elevated so that the lowermost dishes will clear the water level, whereupon the handle brackets 20 are swung inwardly until their lower ends rest upon the upper edge of the main receptacle 1. When the parts are in this position the dishes are scalded upon pouring boiling water thereover and left to drain and dry. Thus it will be seen that dishes may be thoroughly washed and dried without the necessity of handling the same during the washing operation.

What is claimed is:—

A dish washing machine, comprising a receptacle, a dish container adjustably mounted in said receptacle, the said dish container being constructed and arranged to rest on the bottom of the said receptacle or to be maintained in spaced relation thereto, and rods pivotally mounted on the said dish container and adapted to extend through perforations in the receptacle to maintain the container in a predetermined position with relation to the receptacle when the container rests on the bottom thereof and to be swung inwardly to engage the upper edge of the said receptacle to maintain the dish container in its uppermost position in spaced relation to the bottom of the receptacle.

In testimony whereof, I affix my signature, in the presence of two witnesses.

CHARLES SOWDEN.

Witnesses:
J. C. FLETCHER,
J. T YULE.